(12) United States Patent
Kikuchi et al.

(10) Patent No.: US 11,336,103 B2
(45) Date of Patent: May 17, 2022

(54) STORAGE BATTERY SYSTEM WITH STATE OF CHARGE ESTIMATOR CAPABLE OF OUTPUTTING STATUS SIGNAL TO POWER SUPPLY CONTROL CIRCUIT, METHOD, AND COMPUTER PROGRAM PRODUCT

(71) Applicant: KABUSHIKI KAISHA TOSHIBA, Minato-ku (JP)

(72) Inventors: Yusuke Kikuchi, Kawasaki (JP); Kota Asami, Fuchu (JP); Motohiro Itou, Bunkyo (JP); Minoru Gyoda, Tokorozawa (JP); Shinya Sato, Hachioji (JP); Kazuto Kuroda, Arakawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 112 days.

(21) Appl. No.: 16/646,791

(22) PCT Filed: Nov. 10, 2017

(86) PCT No.: PCT/JP2017/040630
§ 371 (c)(1),
(2) Date: Mar. 12, 2020

(87) PCT Pub. No.: WO2019/092855
PCT Pub. Date: May 16, 2019

(65) Prior Publication Data
US 2020/0266644 A1 Aug. 20, 2020

(51) Int. Cl.
*H02J 7/00* (2006.01)
*H01M 10/42* (2006.01)
*H01M 10/44* (2006.01)

(52) U.S. Cl.
CPC ....... *H02J 7/0048* (2020.01); *H01M 10/4257* (2013.01); *H01M 10/44* (2013.01); *H02J 7/00306* (2020.01); *H01M 2010/4271* (2013.01)

(58) Field of Classification Search
CPC .............. H02J 7/0048; H02J 7/00306; H01M 10/4257; H01M 10/44; H01M 2010/4271
(Continued)

(56) References Cited

U.S. PATENT DOCUMENTS

| 2011/0273804 A1* | 11/2011 | Ikeuchi | H02J 7/0031 361/63 |
| 2013/0187466 A1* | 7/2013 | Sakai | H02J 7/0048 307/52 |
| 2016/0261127 A1* | 9/2016 | Worry | H01M 10/425 |

FOREIGN PATENT DOCUMENTS

| CN | 205051428 U | 2/2016 |
| CN | 106291389 * | 1/2017 |

(Continued)

OTHER PUBLICATIONS

International Search Report dated Dec. 26, 2017 in PCT/JP2017/040630 filed Nov. 10, 2017, 1 page.
(Continued)

*Primary Examiner* — Nathaniel R Pelton
(74) *Attorney, Agent, or Firm* — Oblon, McClelland, Maier & Neustadt, L.L.P.

(57) ABSTRACT

A storage battery system includes a cell module including storage battery cells, a battery management unit configured to maintain a contactor having a normally open contact in a closed state, while being supplied with power, and a power supply control circuit that DC to DC converts the power of the cell module for supply to the battery management unit. The power supply control circuit includes an SOC estimator that determines from a voltage of the cell module whether or (Continued)

not the cell module is in an overdischarge state, and after determining that the cell module is not in the overdischarge state, outputs a status signal to the power supply control circuit. In response to no receipt of the status signal from the SOC estimator, the power supply control circuit interrupts the power supply to the battery management unit from the cell module.

5 Claims, 3 Drawing Sheets

(58) Field of Classification Search
USPC .......................................................... 320/134
See application file for complete search history.

(56) References Cited

FOREIGN PATENT DOCUMENTS

| CN | 106291389 A | 1/2017 |
|----|-------------|--------|
| JP | 7-59270 A | 3/1995 |
| JP | 2014-195401 A | 10/2014 |
| WO | WO 2012/049965 A1 | 4/2012 |

OTHER PUBLICATIONS

Extended European Search Report dated May 28, 2021 in corresponding European Patent Application No. 17931575.9, 11 pages.

* cited by examiner

STORAGE BATTERY SYSTEM WITH STATE OF CHARGE ESTIMATOR CAPABLE OF OUTPUTTING STATUS SIGNAL TO POWER SUPPLY CONTROL CIRCUIT, METHOD, AND COMPUTER PROGRAM PRODUCT

CROSS-REFERENCE TO RELATED APPLICATIONS

This application is a national stage application of International Application No. PCT/JP2017/040630, filed Nov. 10 2017, which designates the United States, the entire contents of which are incorporated herein by reference.

TECHNICAL FIELD

Embodiments described herein relate generally to a storage battery system, a method, and a computer program product.

BACKGROUND ART

Conventionally, storage battery systems including storage batteries for power supply are requested to include a mechanism that prevents failures due to over discharge by shutting down power supply paths, in a situation that the storage batteries may excessively discharge.

A power source for operating a battery management unit (BMU) may be supplied with power from the storage batteries of such a storage battery system. In such a case, it is effective for the power source to incorporate a mechanism that interrupts the power supply to the BMU for prevention of over discharge, to operate the mechanism and reduce power consumption when the storage batteries lower in remaining capacity.

In spite of the demands as above, the mechanism may preferably not function.

For example, during charging to recover the batteries that may have excessively discharged, current paths are to be ensured for charging.

As another example, during maintenance work of the storage battery system (e.g., acquiring BMU failure logs or updating firmware after interrupting power supply to a main circuit such as a load), a service worker familiar with handling storage batteries is usually present. Possibility of over discharge is thus low.

If a worker attends to maintenance work in a situation that the batteries may excessively overcharge, it means that the worker prioritizes the maintenance work over battery protection, therefore, the maintenance work is to continue while the BMU is continuously supplied with power supply.

It is practical to implement over discharge detection in the BMU by software processing in terms of cost and simple operation. For safety purpose, it is thus preferable to provide a structure that does not disable an over discharge detection function in case of software hang-up or malfunction.

It is preferable to provide a storage battery system, a method, and a computer program product that can interrupt power supply to a load or a BMU when storage batteries are likely to excessively discharge and when software of the BMU hangs up.

DETAILED DESCRIPTION

According to one embodiment, in general, a storage battery system includes a cell module including storage battery cells; a battery management unit that is able to maintain a contactor having a normally open contact in a closed state, while being supplied with power, the normally open contact inserted in a current supply path through which stored power is supplied from the cell module to an outside; and a power supply control circuit that DC to DC converts the power of the cell module for supply to the battery management unit. The power supply control circuit includes a state of charge estimator that determines from a voltage of the cell module whether or not the cell module is in an overdischarge state, and after determining that the cell module is not in the overdischarge state, outputs a status signal to the power supply control circuit. In response to no receipt of the status signal from the state of charge estimator, the power supply control circuit interrupts the power supply to the battery management unit from the cell module.

The following will describe an embodiment in detail with reference to the accompanying drawings.

Figure 1:
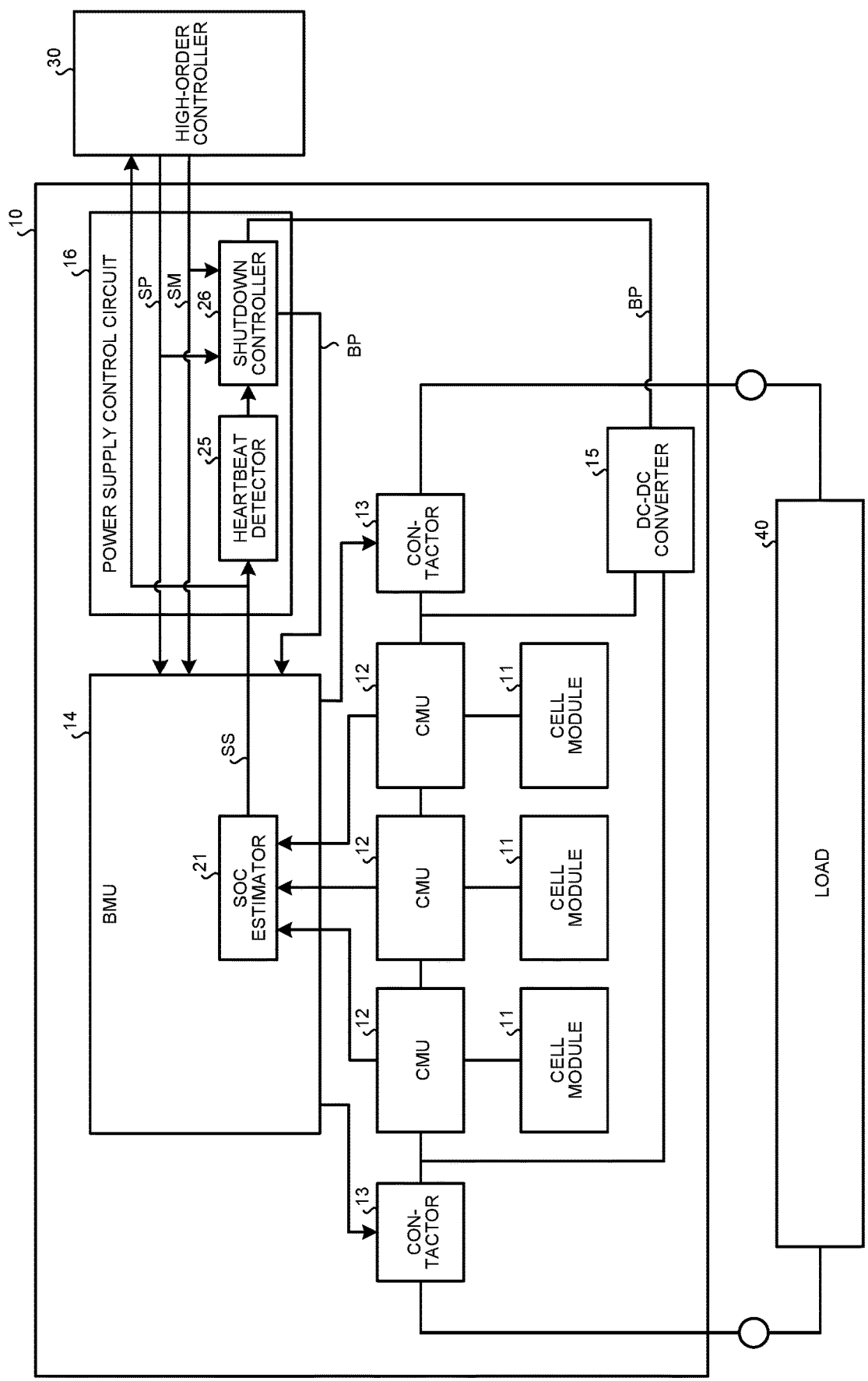
FIG. 1 is a schematic block diagram of a configuration of a storage battery system in an embodiment.

FIG. 1 is a schematic block diagram of a configuration of a storage battery system in an embodiment.

A storage battery system 10 is connected to a high-order controller 30 that controls the storage battery system 10, and a load 40 such as an electric motor that is supplied with power from the storage battery system 10 to operate.

The storage battery system 10 generally includes a plurality of (three in the example in FIG. 1) cell modules 11 of battery cells connected in series and parallel; cell monitoring units (CMUs) 12 that correspond to the cell modules 11, and monitor the temperature of the corresponding cell modules and the voltage of the battery cells of the corresponding cell modules; a contactor pair 13 that electrically disconnects the cell modules 11 from the load 40 effectively, a battery management unit (BMU) 14 that controls the storage battery system 10 under the control of the high-order controller 30, a DC-DC converter 15 that performs DC-DC conversion of stored power of the cell modules 11 to supply power to the BMU 14, and a power supply control circuit 16 that controls a power supply to the BMU 14.

The BMU 14 can maintain the contactor pair 13 in a closed state (ON state) when supplied with BMU power being power supply of the BMU. When supply of BMU power BP is interrupted, the contactors 13 turn into an open state (OFF state), interrupting the power supply to the load 40 from the cell modules 11.

The BMU 14 includes an SOC estimator 21 that estimates a state of charge (SOC) of the cell modules 11 from the voltages of the battery cells monitored by the CMUs 12, and outputs an SOC signal SS corresponding to an estimated value.

The SOC signal SS serves as a pulse signal that alternately transitions between an H-level and an L-level. In the present embodiment, the length of an H-level duration in one cycle of the SOC signal SS represents a value of the SOC of cell modules.

Figure 2:
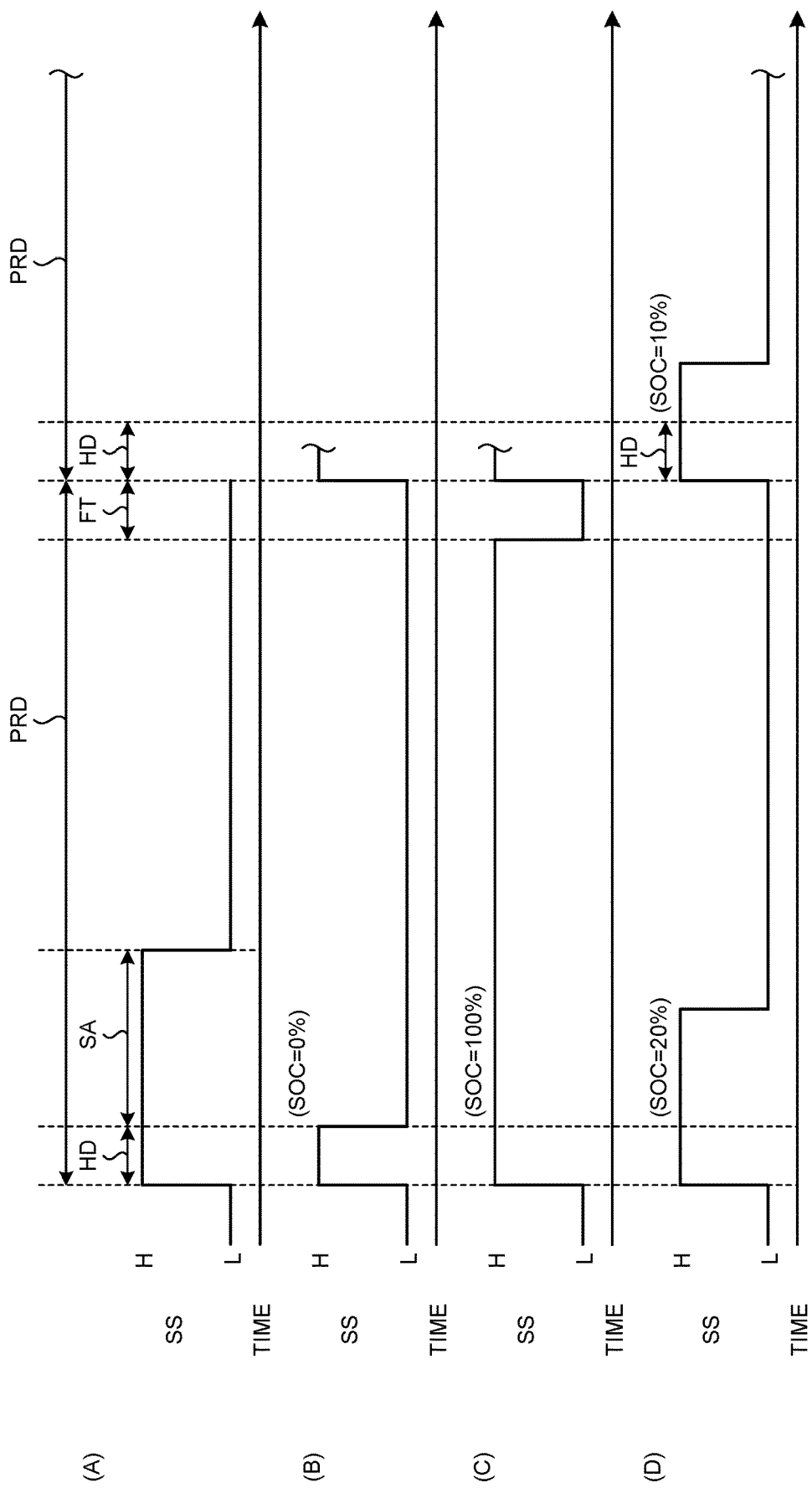
FIG. 2 is an explanatory view of an SOC signal.

FIG. 2 is an explanatory view of the SOC signal.

Specifically, as illustrated in (A) of FIG. 2, in a cycle PRD being one cycle of the SOC signal SS, a heartbeat detection header HD (e.g., in a cycle PRD of 120 [ms], HD is 10 [ms]) is set at the head of the cycle PRD. In the heartbeat detection header HD the SOC signal SS is constantly at the H-level. A duration SA corresponding to an SOC value is set after the heartbeat detection header HD. At the end of the cycle PRD, a heartbeat detection footer FT is set, in which the SOC signal SS is constantly at the L-level (e.g., in the cycle PRD of 120 [ms], FT is 10 [ms]). In the duration SA, the SOC signal is maintained in the H-level for a time period corresponding to the value of the SOC. This makes it possible to toggle the SOC signal SS irrespective of the length of the duration SA.

For example, as illustrated in (B) of FIG. 2, when the SOC is 0%, the duration SA is set to zero [ms]. As illustrated in (C) of FIG. 2, when the SOC is 100%, the duration SA is set to 100 [ms], for which the SOC signal SS is maintained in the H-level.

Then, the SOC signal SS is controlled to remain in the L-level (including heartbeat detection footer FT) until the cycle PRD ends.

In the case of the SOC being 20% in the previous measurement, for example, the duration SA is 20 [ms] in the example as above. At the SOC lowering to 10% in the current measurement, the duration SA is reduced to 10 [ms], as illustrated in (D) of FIG. 2.

In this case, the SOC 0% corresponds to a minimum battery capacity of the battery cells in normal use while the SOC 100% corresponds to a maximum battery capacity of the battery cells in normal use. The batteries are used in this range to prevent the batteries from shortening in longevity.

As the capacity of the battery cells, the SOC can be less than 0% and exceed 100%. The over discharge of the battery cells is thus located in a region below the SOC 0% while the over charge of the battery cells is located in a region above the SOC 100%.

The power supply control circuit 16 includes a heartbeat detector 25 and a shutdown controller 26. The heartbeat detector 25 receives the SOC signal SS and outputs a shutdown signal SD when a duration in which the SOC signal SS does not transition (vary) continuously exceeds a shutdown determination time TS. The shutdown controller 26 stops supply of BMU power serving as the power source of the BMU 14 to shut down the BMU 14, upon receipt of the shutdown signal SD from the heartbeat detector 25.

The reason why the shutdown signal SD is output when a duration in which the SOC signal SS does not transition (vary) continuously exceeds the shutdown determination time TS is that the BMU 14 is also shut down at the time of occurrence of a failure in fixation of the SOC signal at the L-level or the H-level.

In this case, the shutdown determination time TS is set to a larger value than the cycle PRD, including a margin of frequency error between the clock of the BMU 14 and the clock (asynchronous with the clock of the BMU 14) of the power supply control circuit 16. This setting enables the storage battery system to deal with a situation that a toggle signal cannot be output at the time of booting due to software control and that the signal control is unfeasible at exact timing due to processing delay, for example.

The specific value of the shutdown determination time TS is to be set appropriately, considering the above margin and response delay at the time of over discharge detection. In the cycle PRD of 120 [ms] as described above, for example, the shutdown determination time TS is set to 1000 [ms].

The power supply control circuit 16 receives, from the high-order controller 30, an H-level power supply signal SP for instructing a power supply to the BMU 14 during normal operation of the BMU 14, and an H-level maintenance power supply signal SM that instructs a maintenance power supply to the BMU 14 during maintenance of the BMU 14.

While receiving no shutdown signal SD, the power supply control circuit 16 supplies to the BMU 14 the BMU power output from the DC-DC converter 15 in response to receipt of the H-level power supply signal SP or the H-level maintenance power supply signal SM.

While receiving the shutdown signal SD, the power supply control circuit 16 supplies to the BMU 14 the BMU power output from the DC-DC converter 15 in response to receipt of the H-level maintenance power supply signal SM.

The following will describes the operation of the embodiment.

Figure 3:
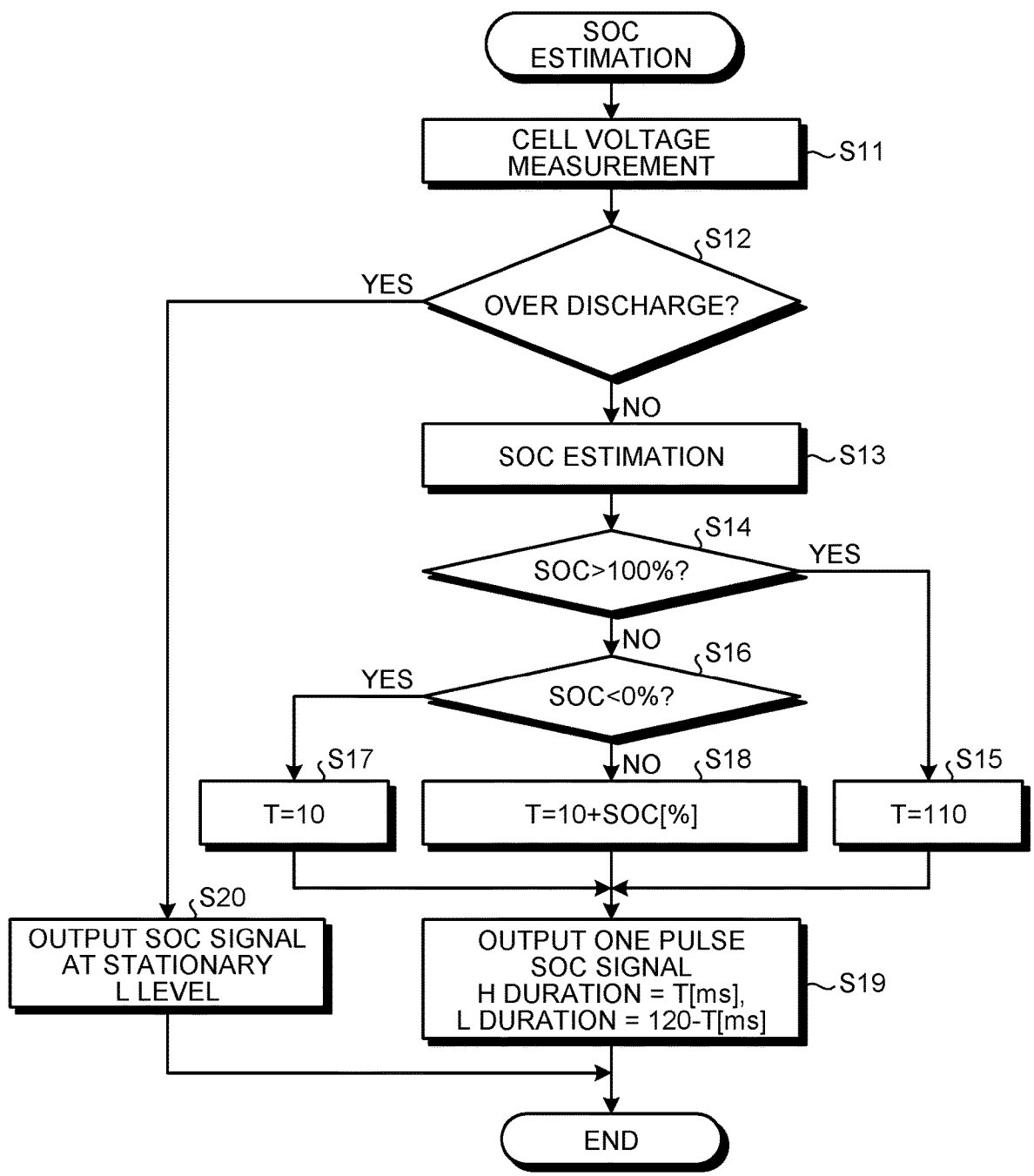
FIG. 3 is a flowchart of processing of the embodiment.

FIG. 3 is a flowchart of processing in the embodiment.

The BMU 14 causes the CMUs 12 to measure the cell voltages of the battery cells of the cell modules 11 and acquires a result of the measurement (step S11).

The SOC estimator 21 of the BMU 14 determines whether the cells are in an over discharge state from the acquired cell voltages (step S12).

After determining that the cells are in the over discharge state at step S12 (Yes at Step S12), the SOC estimator 21 of the BMU 14 outputs the SOC signal SS at the L-level in a stationary manner (step S20), completing the processing.

After determining that the cells are not in the over discharge state at step S12 (No at Step S12), the SOC estimator 21 of the BMU 14 estimates an SOC from the acquired cell voltages (step S13).

The SOC estimator 21 determines whether the estimated SOC exceeds 100% (step S14).

After determining that the estimated SOC exceeds 100% at step S14 (Yes at step S14), the SOC estimator 21 sets, to 110 [ms], an H-level duration T in one cycle (set to 120 [ms] in the following as an example) of the SOC signal SS serving as a pulse signal alternately transitioning between the H-level and the L-level, and proceeds to step S19.

After determining that the estimated SOC is equal to or smaller than 100% at step S14 (No at step S14), the SOC estimator 21 determines whether the estimated SOC is smaller than 0% (step S16).

After determining that the estimated SOC is smaller than 0% at step S16 (Yes at step S16), the SOC estimator 21 sets the H-level duration T in one cycle (set to 120 [ms] in the following as an example) of the SOC signal SS to 10 [ms], that is, sets the SOC signal SS to the H-level in the duration of the heartbeat detection header HD (step S17), and proceeds to step S19.

After determining that the SOC is equal to or larger than 0% at step S16 (No at step S16), that is, that the SOC is 0% or more and less than 100% together with the result of the determination at step S14, the SOC estimator 21 defines the H-level duration T in one cycle of the SOC signal SS by the following expression (step S18):

$$T=10+\text{percentage value of } SOC.$$

The SOC estimator 21 generates the SOC signal SS of a cycle 120 [ms] including an H-level duration of T[ms] and an L-level duration of 120-T[ms], and outputs the generated SOC signal SS to the power supply control circuit 16 and the high-order controller 30 (step S19).

As a result, the heartbeat detector 25 of the power supply control circuit 16 detects the pulse of the SOC signal SS. In response to detection of no pulse, the power supply control circuit 16 controls the shutdown controller 26 to stop supply of the BMU power to the BMU 14 and shut down the BMU 14.

Thus, the contactors 13 cannot maintain the closed state (ON state) and turns into the open state (OFF state). That is, the contactors 13 are no longer continuously supplied with power from the cell modules 11, which prevents the cell modules 11 from entering a further over discharge state.

The shutdown controller 26 receives the power supply signal SP indicating power supply or no power supply in normal operation (e.g., H-level during power supply) and the maintenance power supply signal SM indicating maintenance power supply or no maintenance power supply during maintenance (e.g., H-level during maintenance power supply). The power supply signal SP indicating L-level (during no power supply) and the maintenance power supply signal SM indicating H-level (during maintenance power supply) signify a maintenance mode in which the BMU 14 is under maintenance. In such a case, the BMU power is continuously supplied.

As described above, according to the embodiment, the SOC estimator 21 outputs no SOC signal SS serving as a heartbeat signal during over discharge, to stop power supply to the BMU 14, placing the contactors 13 in the open state and thereby preventing progress of the over discharge state.

Likewise, in response to a hang-up of the computer program (software) controlling the BMU 14, the SOC estimator 21 outputs no SOC signal SS serving as a heartbeat signal to stop power supply to the BMU 14, placing the contactors 13 in the open state. As a result, the cell modules are prevented from entering the over discharge state or the over discharge state will not progress due to the hang-up.

In such cases, the SOC signal SS includes SOC information so that the high-order controller 30 can constantly understand the SOC state.

When receiving the H-level maintenance power supply signal SM from the high-order controller 30, the BMU 14 places the contactors 13 in the open state (OFF state) to stop the power supply to the load 40, and provides functions such as acquisition of failure logs and firmware update. Herein, the maintenance power supply signal SM is not controlled by software for the purpose of avoiding the storage battery system 10 actually operating from erroneously entering the maintenance mode due to software malfunction and disabling the protection.

In the above embodiment, the SOC value is notified depending on the length of the H-level duration of the SOC signal SS. However, the value of the SOC can also be notified depending on the length of the L-level duration using the inversed signal of the SOC signal SS.

The computer program to be executed by the storage battery system of the embodiment is recorded and provided in an installable or executable file format on a computer-readable recording medium such as a CD-ROM, a flexible disk (FD), a CD-R, and a digital versatile disc (DVD).

The computer program to be executed by the storage battery system of the embodiment may be stored in a computer connected to a network such as the Internet and provided by being downloaded via the network. The computer program to be executed by the storage battery system of the embodiment may be provided or distributed via a network such as the Internet.

The computer program to be executed by the storage battery system in the embodiment may be embedded and provided in a ROM, for example.

While certain embodiments have been described, these embodiments have been presented by way of example only, and are not intended to limit the scope of the inventions. Indeed, the novel methods and systems described herein may be embodied in different other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A storage battery system, comprising:
a cell module including storage battery cells;
a battery management unit that:
is able to maintain a contactor having a normally open contact in a closed state, while being supplied with power, the normally open contact inserted in a current supply path through which stored power is supplied from the cell module to an outside; and
a power supply control circuit that DC to DC converts the power of the cell module for supply to the battery management unit, wherein
the battery management unit comprises a state of charge estimator that:
determines from a voltage of the cell module whether or not the cell module is in an overdischarge state; and
outputs a status signal to the power supply control circuit, the status signal serving as an alternating signal having a given in which a potential level transitions between an H-level and an L-level, and being to be fixedly output at the H-level or the L-level when the cell module is in an overdischarge state; and
the power supply control circuit determines that the status signal is not output, when a non-transition period of the status signal exceeds a given period, and interrupts the power supply to the battery management unit from the cell module.

2. The system of claim 1, wherein the alternating signal represents an SOC value of the cell module that is estimated by the battery management unit based on a length of a duration of the H-level or the L-level.

3. The system of claim 1, wherein in response to receipt of a maintenance signal for performing maintenance of the battery management unit from a high-order device, the power supply control circuit continues the power supply to the battery management unit in spite of having determined that the status signal is not output.

4. A method to be executed by a storage battery system, the system comprising a cell module including storage battery cells; a battery management device that receives power supply from the cell module to operate; a contactor that is controlled by the battery management device and has a normally open contact inserted in a current supply path through which stored power is suppled from the cell module to an outside; and an interrupter that interrupts the power supply to the battery management device from the cell module, the method comprising:
outputting a status signal serving as an alternating signal having a given cycle in which a potential level transitions between an H-level and an L-level, and being to be fixedly output at the H-level or the L-level when the cell module is in an overdischarge state;
determining that the status signal is not output, when a non-transition period of the status signal exceeds a given period; and
interrupting the power supply to the battery management unit from the cell module after determining that the status signal is not output.

5. A computer program including programmed instructions embodied in and stored on a non-transitory computer readable medium, wherein the instructions are to be executed by a computer to control a battery management system, the system comprising a cell module including storage battery cells; a battery management device that receives power supply from the cell module to operate; a contactor that is controlled by the battery management device and has a normally open contact inserted in a current supply path through which stored power is supplied from the cell module to an outside; and an interrupter that interrupts the power supply to the battery management device from the cell module, the instructions, when executed by the computer, causing the computer to perform:

receiving input of a status signal serving as an alternating signal having a given cycle in which a potential level transitions between an H-level and an L-level, and being to be fixedly input at the H-level or the L-level when the cell module is in an overdischarge state;

determining no input of the status signal when a non-transition period of the status signal exceeds a given period; and interrupting the power supply to the battery management unit from the cell module after determining no input of the status signal.

\* \* \* \* \*